(12) United States Patent
Gardynik et al.

(10) Patent No.: US 9,102,361 B2
(45) Date of Patent: Aug. 11, 2015

(54) VEHICLE HOOD FOLD INITIATOR FREE OF STRUCTURAL REINFORCEMENT

(71) Applicant: Ford Global Technologies, LLC, Dearborn, MI (US)

(72) Inventors: Michael J. Gardynik, Farmington Hills, MI (US); Christopher Pope, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/150,096

(22) Filed: Jan. 8, 2014

(65) Prior Publication Data

US 2015/0191205 A1    Jul. 9, 2015

(51) Int. Cl.
*B62D 25/12* (2006.01)

(52) U.S. Cl.
CPC ...................... *B62D 25/12* (2013.01)

(58) Field of Classification Search
CPC ...... B62D 25/105; B62D 25/12; B60R 21/38; B60R 2021/343
USPC .......... 296/193.11, 187.04, 187.03; 180/69.2, 180/69.21
See application file for complete search history.

(56) References Cited

U.S. PATENT DOCUMENTS

| 7,635,157 B2 * | 12/2009 | Wang et al. ............... 296/193.11 |
| 7,984,943 B2 * | 7/2011 | Iwano et al. ............. 296/193.11 |
| 2012/0285759 A1 | 11/2012 | Ikeda et al. |

FOREIGN PATENT DOCUMENTS

| CN | 202806885 | 3/2013 |
| FR | 2917053 | 12/2008 |
| JP | 05139338 | 6/1993 |
| JP | 2006056327 | 3/2006 |
| JP | 2009248699 | 10/2009 |
| JP | 2011131702 | 7/2011 |
| JP | 2013001215 | 1/2013 |

* cited by examiner

*Primary Examiner* — Glenn Dayoan
*Assistant Examiner* — Melissa A Black
(74) *Attorney, Agent, or Firm* — Raymond Coppiellie; Price Heneveld LLP

(57) ABSTRACT

A vehicle hood includes an outer hood member, an inner hood member attached to an under side of the outer hood member and defining at least one fold-initiating opening through the inner hood member and a plurality of structural reinforcements defined by the inner hood member, wherein the at least one fold-initiating opening is positioned distal from each of the plurality of structural reinforcements.

18 Claims, 4 Drawing Sheets

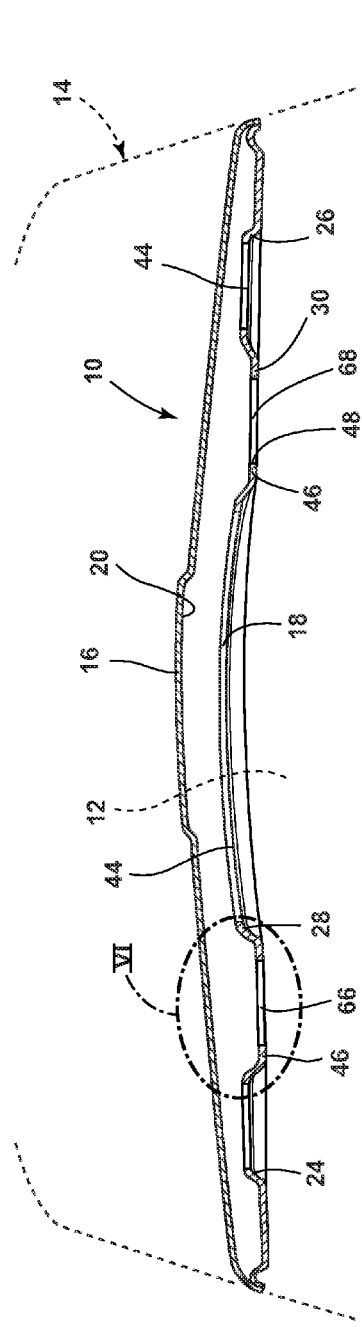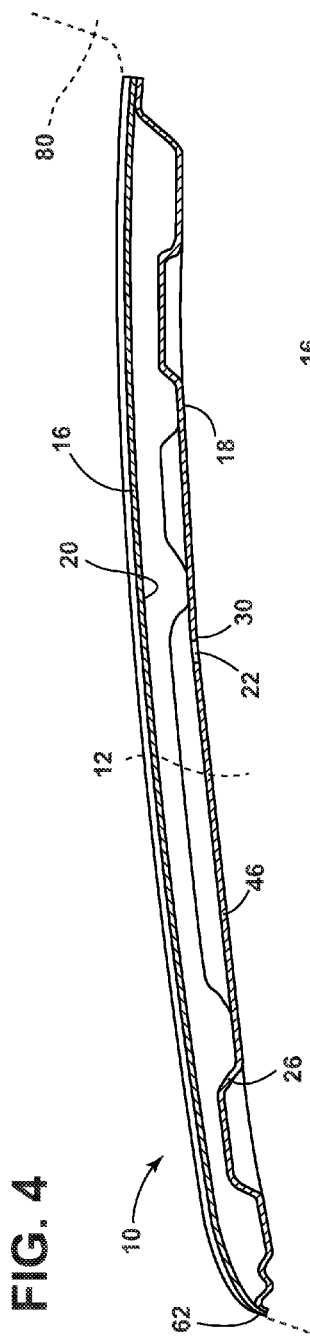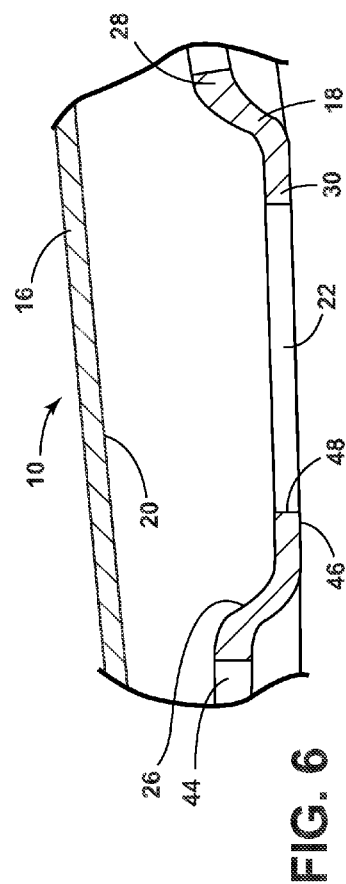
FIG. 4
FIG. 5
FIG. 6

VEHICLE HOOD FOLD INITIATOR FREE OF STRUCTURAL REINFORCEMENT

FIELD OF THE INVENTION

The present invention generally relates to vehicle hoods, and more specifically, a fold-initiating design for a vehicle hood proximate the vehicle's engine compartment.

BACKGROUND OF THE INVENTION

The hood of a vehicle typically includes a mechanism for receiving impact forces when the vehicle is in a collision. These mechanisms generally are designed to allow the hood to crumple or fold in a predetermined location to maximize the absorption of collision forces and minimize the transfer of collision forces through the hood and into the cabin compartment of the vehicle. Many such mechanisms include structural features disposed within the paneling of the vehicle hood.

SUMMARY OF THE INVENTION

According to one aspect of the present invention, a vehicle hood includes an outer hood member and an inner hood member attached to an under side of the outer hood member. The inner hood member defines at least one fold-initiating opening through the inner hood member. A plurality of structural reinforcements are defined by the inner hood member. The at least one fold-initiating opening is positioned distal from each of the plurality of structural reinforcements.

According to another aspect of the present invention, a hood for a vehicle includes an outer hood member and an inner hood member coupled to an underside of the outer hood member. At least one fold-initiating opening is defined within the inner hood member. A rim of the at least one fold-initiating opening is free of structural reinforcement. The rim of each fold-initiating opening defines a weakened portion of the inner hood member.

According to another aspect of the present invention, a vehicle hood includes an outer hood member and an inner hood member attached to a lower surface of the outer hood member. The inner hood member defines a substantially planar portion, at least one structural fold and a plurality of fold-initiating openings. Each fold-initiating opening defines a cutout within the substantially planar portion. Each fold-initiating opening is free of engagement with the at least one structural fold.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a cross-sectional view of the embodiment of FIG. 2 taken at line IV-IV;

FIG. 5 is a cross-sectional view of the embodiment of FIG. 2 taken at line V-V;

FIG. 6 is a detail cross-sectional view of the embodiment of FIG. 4 taken at area VI-VI;

DETAILED DESCRIPTION OF THE PREFERRED EMBODIMENTS

Figure 1:
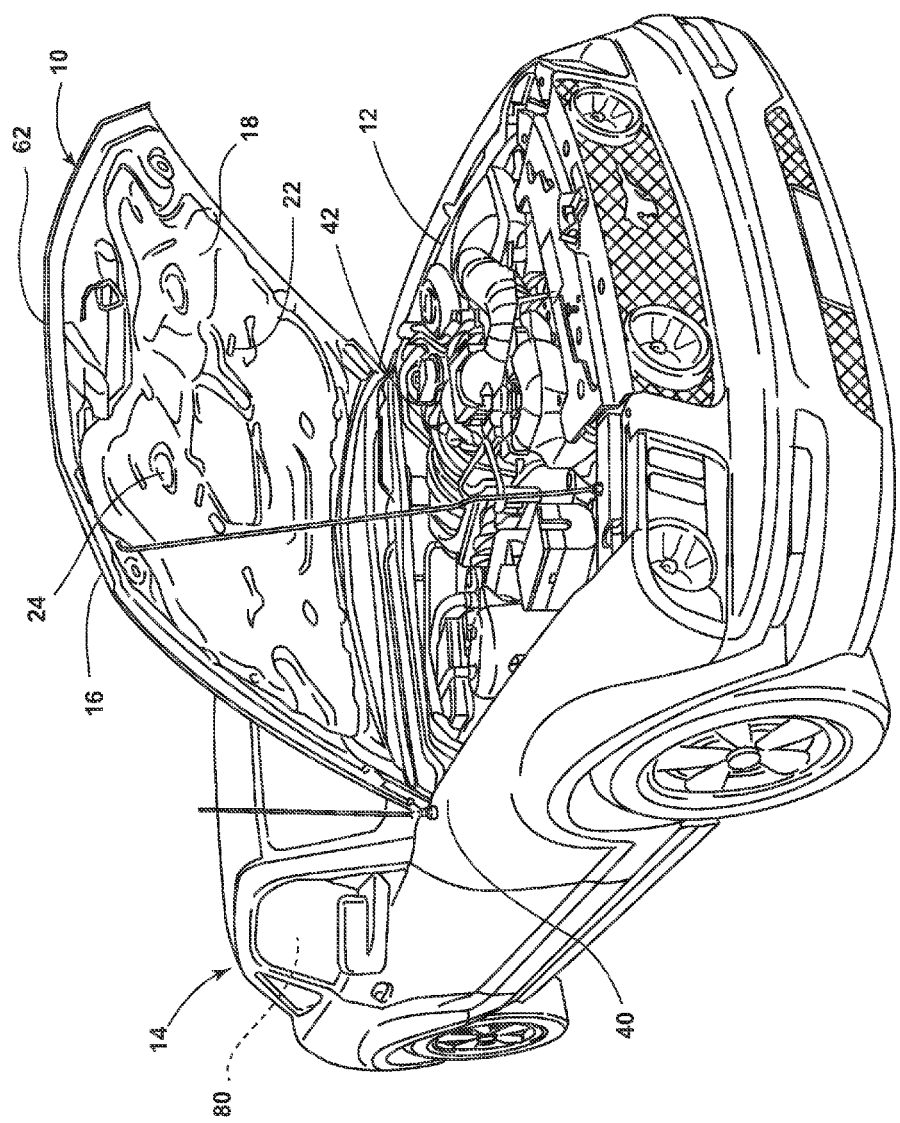
FIG. 1 is a front top perspective view of a vehicle with an embodiment of the fold initiator included within the vehicle hood and the vehicle hood in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a vehicle hood 10 shown and installed over the engine compartment 12 of a vehicle 14, according to one embodiment. The vehicle hood 10 includes an outer hood member 16 and an inner hood member 18 attached to an underside 20 of the outer hood member 16. The inner hood member 18 defines at least one fold-initiating opening 22 through the inner hood member 18. A plurality of structural reinforcements 24 are defined by the inner hood member 18, wherein the at least one fold-initiating opening 22 is positioned distal from each of the structural reinforcements 24. The structural reinforcements 24 of the vehicle hood 10 can include structural folds 26, structural channels, thickened portions 28 of a part of the vehicle hood 10, buttressing members, and other similar structural features. In the various embodiments, the fold-initiating openings 22 defined within the inner hood member 18 are spaced apart from these structural reinforcements 24 and define weakened portions 30 of the vehicle hood 10.

Figure 3:
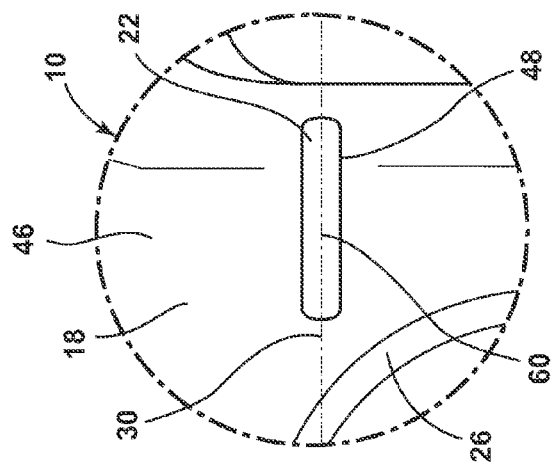
FIG. 3 is a detail bottom plan view of the embodiment of FIG. 2 taken at area III.
Figure 2:
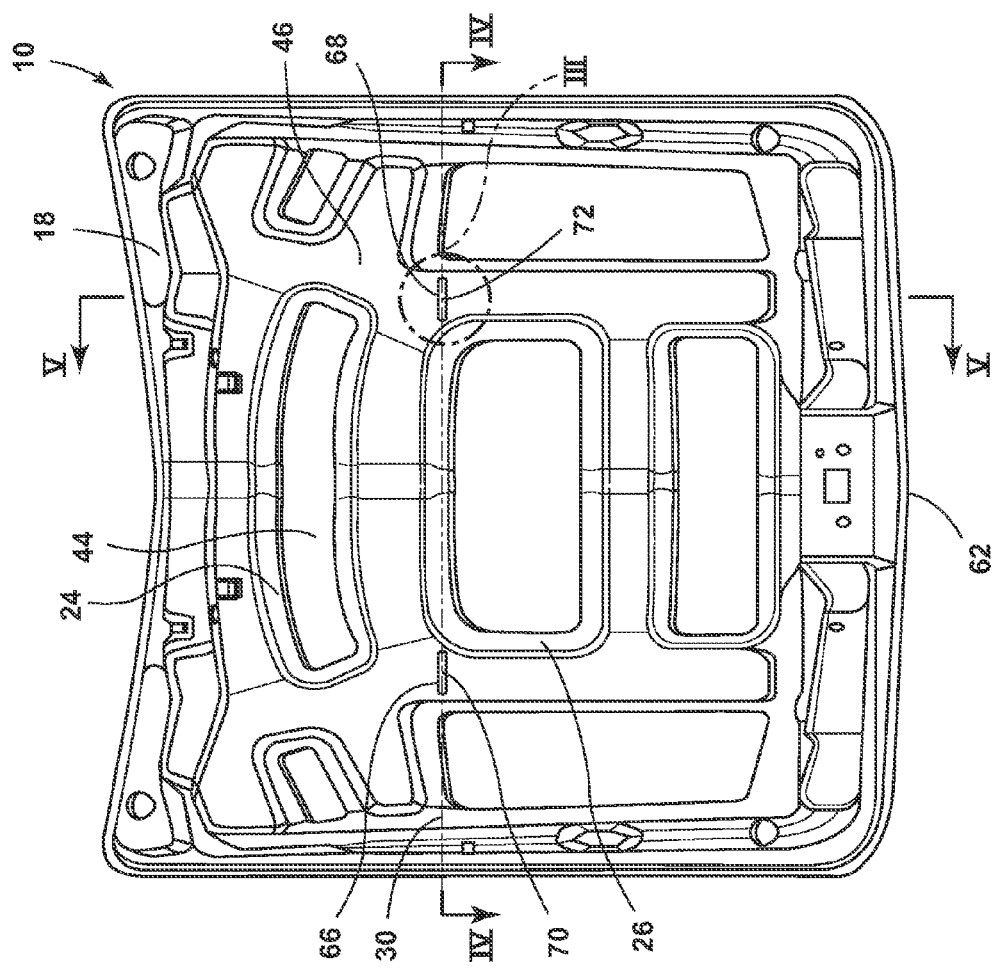
FIG. 2 is a bottom plan view of the vehicle hood of FIG. 1.

Referring now to FIGS. 1-3, the vehicle hood 10 is hingedly coupled to the body 40 of the vehicle 14, and is designed to cover the engine 42 and engine compartment 12 of the vehicle 14. The inner hood member 18 of the vehicle hood 10 includes several structural apertures 44 that are configured to receive various portions of the engine 42 and related mechanical features of the vehicle 14 when the vehicle hood 10 is in a closed position. These structural apertures 44 typically include one or more of the structural reinforcements 24 described above and are configured to strengthen the areas of the inner hood member 18 surrounding the structural apertures 44. Surrounding the structural apertures 44, the inner hood member 18 includes a substantially planar portion 46. The various fold-initiating openings 22 of the inner hood member 18 are positioned within the planar portion 46 of the inner hood member 18. In this manner, the areas surrounding each of the fold-initiating openings 22 lay substantially flat and free of structural curves or structural contours that could serve to strengthen the outer edge 48 of the fold-initiating opening 22 and the areas immediately surrounding the fold-initiating opening 22.

Referring now to the embodiment of FIGS. 2-8, the fold-initiating openings 22 of the inner hood member 18 can be defined by an elongated slot having a primary axis 60. In this configuration, the weakened portion 30 of the inner hood member 18 and the vehicle hood 10 is positioned proximate the primary axis 60 of the elongated fold-initiating opening 22. By way of explanation, and not limitation, in a frontal collision condition, as impact forces 64 are applied to the front 62 of the vehicle hood 10, the primary axis 60 of the elongated fold-initiating opening 22 being weaker than other portions of the inner hood member 18, are allowed to fold or crumple to absorb the collision forces substantially before other portions of the vehicle hood 10. In this manner, the folding of the vehicle hood 10 during a collision situation can be at least partially controlled. Accordingly, the movement of the vehicle hood 10 during a collision situation can be substantially predetermined, as will be more fully described below.

As shown in the embodiment of FIGS. 2-4, the inner hood member 18 can include first and second fold-initiating openings 66, 68, having respective first and second primary axes 70, 72. It is contemplated that the first and second primary axis 70, 72 can be parallel with one another. In various embodiments, the first and second primary axis 70, 72 can be co-linear with one another. Other non-parallel configurations are also contemplated as to the first and second primary axes 70, 72. It is also contemplated that, in various embodiments, additional fold-initiating openings 22 can be defined within the inner hood member 18 along a single folding axis. The various fold-initiating openings 22 of the inner hood member 18 can also be positioned to define more than one weakened portion 30 within the inner hood member 18.

Referring now to the embodiment illustrated in FIGS. 4-6, the fold-initiating opening 22 can be formed within the inner hood member 18 in such a way that the outer edge 48 of the fold-initiating opening 22 is the same thickness as the surrounding portions of the inner hood member 18 proximate the fold-initiating opening 22. Additionally, various portions of the inner hood member 18 can include the thickened portions 28, particularly around the structural apertures 44, to provide structural reinforcement 24 at various locations of the inner hood member 18. The thickened portions 28 having a material thickness greater than the material thickness of the outer edge 48 of the fold-initiating openings 22 and areas of the inner hood member 28 around the fold-initiating openings 22. The fold-initiating openings 22 of the inner hood member 18 are positioned apart from these thickened portions 28 such that the fold-initiating opening 22 does not receive structural reinforcement 24 from these thickened portions 28 of the inner hood member 18.

In various embodiments, it is contemplated that the fold-initiating openings 22 of the inner hood member 18 can be created by material being removed or cut away during formation of the inner hood member 18. Also, in various embodiments, the fold-initiating openings 22 can be formed around portions of a form used to create the inner hood member 18. These methods help to ensure that substantially precise thicknesses of the materials surrounding the fold-initiating opening 22 can be achieved.

It is contemplated that the fold-initiating openings 22 can be disposed within vehicle hoods 10 that contain materials that include, but are not limited to, aluminum, carbon fiber, composite, steel, or other metallic materials, combinations thereof, and other similar structural materials that can be used to create the inner hood member 18 in the vehicle hood 10 as a whole. Regardless of the material used to create the inner hood member 18 or the manner in which the fold-initiating openings 22 are formed, the fold-initiating openings 22 are created such that the outer edge 48 of the fold-initiating opening 22 and the areas surrounding the fold-initiating opening 22 are free of structural reinforcement 24. In this manner, the fold-initiating opening 22 defines a portion of the inner hood member 18 that is weaker than the surrounding areas, to create a localized strength reduction within the vehicle hood 10. Accordingly, the areas surrounding the fold-initiating opening 22 will experience structural failure during a collision situation substantially before other portions of the vehicle hood 10.

Figure 7:
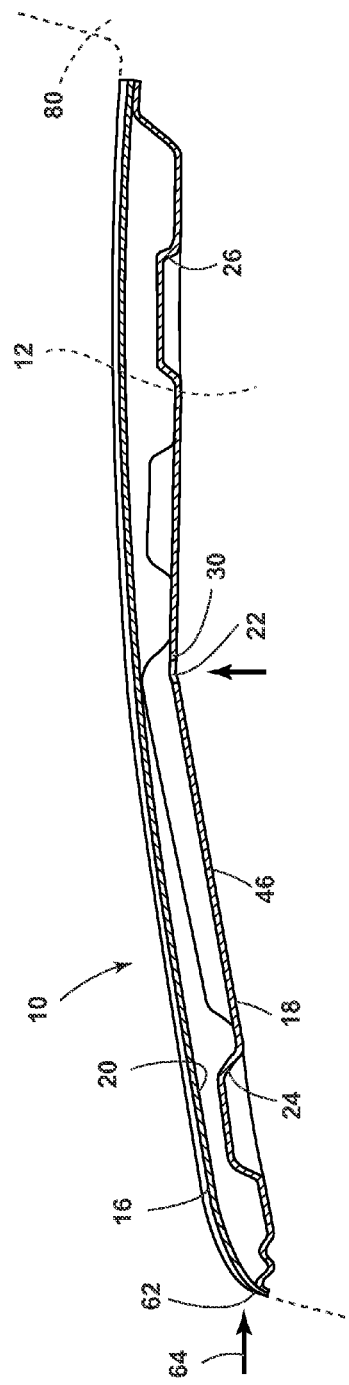
FIG. 7 is a cross-sectional view of the embodiment of FIG. 5 with a frontal load being applied to the vehicle hood.
Figure 8:
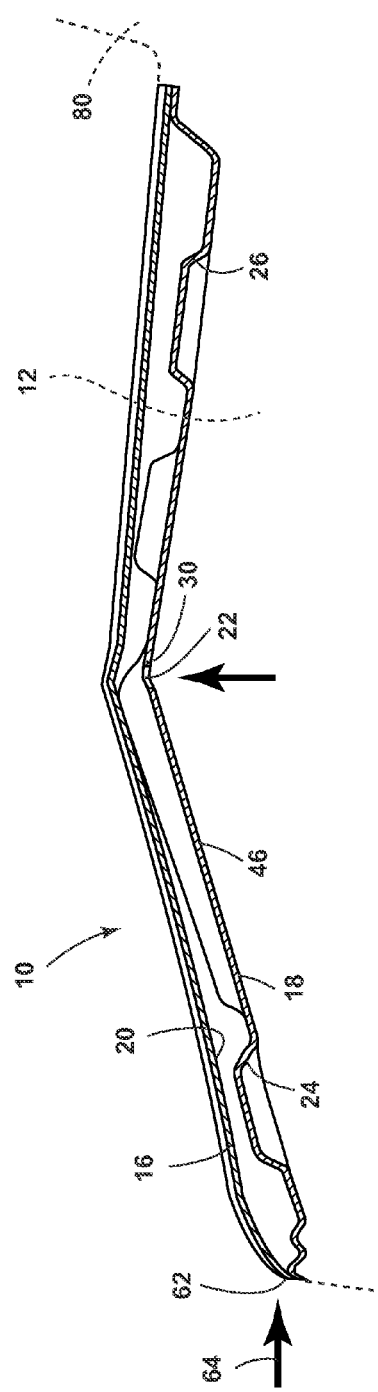
FIG. 8 is a cross-sectional view of the embodiment of FIG. 7 with a greater frontal load being applied to the front of the vehicle hood.

Referring now to the embodiment of FIGS. 7 and 8, when the vehicle 14 is in a collision situation, typically a frontal collision, forces are exerted upon the front edge of the hood and in the direction of the vehicle cabin 80. The fold-initiating opening 22 defines a portion of the inner hood member 18 and the vehicle hood 10 that is substantially weaker than the surrounding portions of a vehicle hood 10. In a collision situation, where the frontal load is applied to the front of the vehicle hood 10, structural failure occurs first at the weakened portions 30 proximate the fold-initiating openings 22 due to the localized strength reduction as a result of the fold-initiating openings 22. In various embodiments, the vehicle hood 10 can be formed in such a manner as to cause the inner hood member 18 to bend upward at the fold-initiating openings 22 and away from the engine compartment 12. In this manner, the bending of the vehicle hood 10 will not be substantially limited by the engine 42 or other mechanical aspects of the vehicle 14 contained within the engine compartment 12.

Referring again to FIGS. 7 and 8, as greater frontal forces are applied to the vehicle hood 10, greater structural failure and greater bending can be experienced by the vehicle hood 10 proximate the fold-initiating openings 22. The bending of the vehicle hood 10 serves to absorb at least a portion of the frontal forces applied to the vehicle 14 as a result of the collision. The absorption of at least a portion of the frontal forces of the collision by the vehicle hood 10 results in less of the force of the collision being transferred to the vehicle cabin 80. In various embodiments, the fold-initiating openings 22 can be configured such that the design failure of the vehicle hood 10 caused by the fold-initiating openings 22 maximizes the absorption of forces as a result of the collision.

In various embodiments, the fold-initiating openings 22 can have any one of a plurality of geometries that can include, but are not limited to, elongated slots, circular apertures, irregular geometries, orthogonal geometries, combinations thereof, and other various configurations. Additionally, the fold-initiating openings 22 can have a plurality of weakening axes such that folding of the inner hood member 18 can occur in different directions, depending upon the type of impact that is experienced by the vehicle 14, such as frontal, side, diagonal, or other crash situations.

In various embodiments, the fold-initiating openings 22 are typically disposed in the vehicle hood 10. It is contemplated that the fold-initiating openings 22 can also be disposed in other portions of the vehicle 14 that include, but are not limited by, body panels, frame members, interior panels, mechanical aspects, as well as other locations. The placement of the fold-initiating openings 22 is configured to create a localized strength reduction that substantially predetermines where a particular member will buckle or fold.

It is contemplated, in various embodiments, that the fold-initiating openings 22 can be thinner portions of material of the inner hood member 18. In such an embodiment, the thinned portions of material are free of additional structural or material reinforcement proximate the fold-initiating opening 22.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hood comprising:
   an outer hood member;
   an inner hood member attached to an under side of the outer hood member and defining at least one fold-initiating opening through the inner hood member; and
   a plurality of structural reinforcements defined by the inner hood member, wherein the at least one fold-initiating opening is positioned within a planar portion of the inner hood member distal from each of the plurality of structural reinforcements.

2. The hood of claim 1, wherein the plurality of structural reinforcements include at least one of structural folds, structural channels and thickened portions of the inner hood member, and wherein the at least one fold-initiating opening defines a weakened portion of the hood.

3. The hood of claim 1, wherein each at least one fold-initiating opening is defined by an elongated slot having a primary axis, and wherein the weakened portion of the hood is positioned proximate the primary axis of the elongated slot.

4. The hood of claim 3, wherein the at least one fold-initiating opening includes first and second fold-initiating openings having first and second primary axes, respectively, wherein the first primary axis is parallel with the second primary axis.

5. The hood of claim 4, wherein the first primary axis is co-linear with the second primary axis.

6. The hood of claim 2, wherein the inner hood member includes a first thickness and the thickened portions of the inner hood member include a second thickness greater than the first thickness, wherein the at least one fold-initiating opening is positioned distal from the thickened portions.

7. A hood for a vehicle, the hood comprising:
   an outer hood member;
   an inner hood member coupled to an underside of the outer hood member and defining at least one fold-initiating slot through a substantially planar portion of the inner hood member; and
   a rim of the at least one fold-initiating slot being free of engagement with a structural reinforcement, the rim of each fold-initiating slot defining a weakened portion of the inner hood member.

8. The hood of claim 7, wherein the at least one fold-initiating slot includes a first fold-initiating slot and a second fold-initiating slot.

9. The hood of claim 8, wherein the first fold-initiating slot includes a first primary axis, and wherein the second fold-initiating slot includes a second primary axis, wherein the weakened portion of the inner hood member is positioned proximate the first and second primary axes.

10. The hood of claim 9, wherein the first primary axis is parallel with the second primary axis.

11. The hood of claim 9, wherein the first primary axis is co-linear with the second primary axis.

12. The hood of claim 8, wherein the at least one fold-initiating slot includes third and fourth fold-initiating slots.

13. The hood of claim 7, wherein the inner hood member includes a first thickness and at least one thickened portion having a second thickness greater than the first thickness, wherein the at least one fold-initiating slot is positioned distal from the at least one thickened portion.

14. A vehicle hood comprising:
   an outer hood member;
   an inner hood member attached to a lower surface of the outer hood member, the inner hood member defining a planar portion and at least one structural fold; and
   a plurality of fold-initiating openings, each fold-initiating opening defining a cutout within the planar portion, wherein each fold-initiating opening is free of engagement with the at least one structural fold.

15. The hood of claim 14, wherein the plurality of fold-initiating openings includes a first fold-initiating opening having a first primary axis and a second fold-initiating opening having a second primary axis, and wherein the first and second primary axes define a weakened portion of the inner hood member.

16. The hood of claim 15, wherein the first primary axis is parallel with the second primary axis.

17. The hood of claim 16, wherein the first primary axis is co-linear with the second primary axis.

18. The hood of claim 14, wherein the inner hood member includes a first thickness and at least one thickened portion having a second thickness greater than the first thickness, wherein each of the plurality of fold-initiating openings are positioned distal from the at least one thickened portion.

* * * * *